United States Patent Office 2,868,955
Patented Jan. 13, 1959

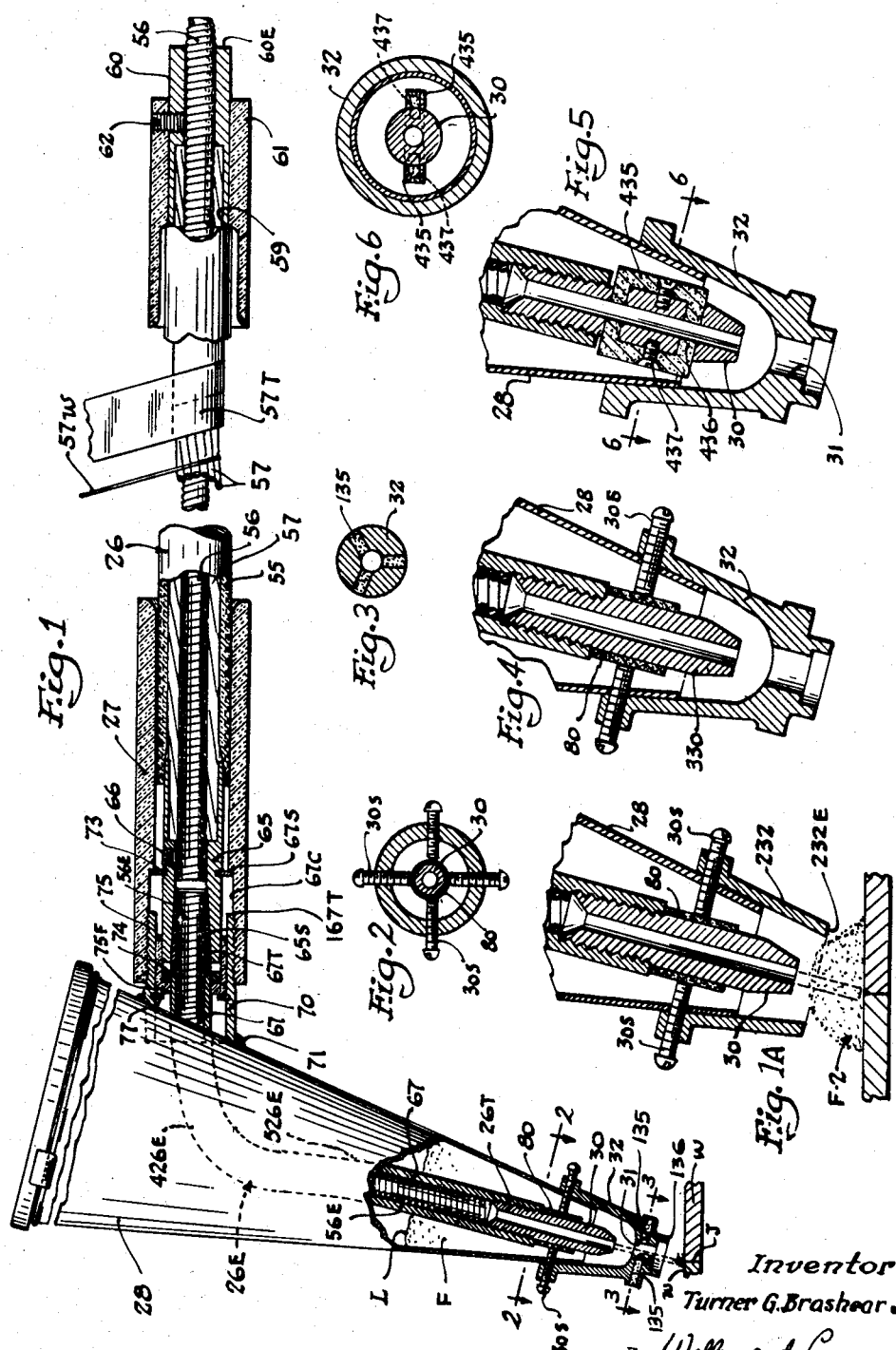

2,868,955
WELDING APPARATUS

Turner G. Brashear, Jr., El Cerrito, Calif., assignor to The American Brake Shoe Company, Wilmington, Del., and New York, N. Y., a corporation of Delaware Original application December 9, 1953, Serial No. 397,181, now Patent No. 2,767,302, dated October 16, 1956. Divided and this application February 16, 1955, Serial No. 490,673

8 Claims. (Cl. 219—130)

This application is a division of my co-pending parent application Serial No. 397,181 filed December 9, 1953, and now issued as Patent No. 2,767,302 dated October 16, 1956.

This invention relates to continuous welding apparatus and particularly to such apparatus that may be utilized for semi-automatic continuous welding operation.

In the past, where continuous welding operations were to be performed, it has been customary to utilize automatic welding apparatus involving the provision of fixed or permanently located welding fixtures, and in other instances where it has been desired to perform continuous welding operations, the welding fixture has been mounted on movable carriages so that it may be advanced along the seam that is to be welded. In many instances, the welding operation is performed through the use of relatively heavy flux-coated welding rods, while in other instances, resort has been had to submerged arc welding techniques so that uncoated welding rod might be used. The apparatus heretofore used has been objectionable in different respects in that the use of flux-coated welding rod has rendered the welding apparatus non-portable in character, while in those instances where resort has been had to submerged arc welding, it has been impossible to judge the character or proper location of the welded seam that is being formed.

In the use of apparatus where welding wire is automatically fed to the tip, it often happens that the welding wire freezes or becomes immovably attached to the tip, and a further object of the present invention is to afford a wire guiding means whereby the removal of the welding wire in such instances is facilitated.

In the application of flux to the uncoated welding wire, a magnetizable welding flux is utilized and is supplied from a supply hopper, the lower or discharge end of which surrounds the welding tip, and the thickness of the coating of welding flux that is applied to the welding wire must be governed by a metering or discharging orifice located between the welding tip and the point at which the welding actually takes place. This discharge orifice of the hopper is therefore located in such close proximity to the molten metal during the welding operation that it is subjected to splatter of the weld material, and a further object of the present invention is to protect the discharge orifice of the hopper so that this orifice does not tend to become plugged or modified in shape in the course of a welding operation.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a longitudinal sectional view through the flux-hopper, the welding tip and the flexible guide housing of the present invention;

Fig. 1A is a cross sectional view of the flux-hopper modified for use in submerged arc welding operations;

Fig. 2 is a transverse sectional view of the welding tip and hopper taken substantially along the line 2—2 of Fig. 1;

Fig. 3 is a transverse cross sectional view of the discharge end of the hopper, the view being taken substantially along the line 3—3 of Fig. 1;

Fig. 4 is a fragmentary vertical section of the lower portion of the hopper and welding tip and illustrating an alternative embodiment;

Fig. 5 is a view similar to Fig. 4 and illustrating a further alternative embodiment of the invention;

Fig. 6 is a transverse cross sectional view of the hopper and tip, the view being taken substantially along the line 6—6 of Fig. 5.

For purposes of disclosure, the invention is herein illustrated as embodied in an insulated flux hopper 28 through which a relatively thin uncoated welding wire R is fed to the weld point as described in detail in said parent application, and in doing this the welding wire R is fed through an elongated flexible hose-like housing 26 which is relatively long and which at its other end extends through a tubular insulating handle 27 that projects laterally from one side of the conical flux-hopper 28. The flexible hose-like housing 26 extends through the handle 27 and has a separably related extension 26E disposed within the hopper 28 and terminating in a welding tip 30 disposed in a centered relation axially of the hopper 28 and aligned with a discharge orifice 31 that is formed in a detachably related discharge head 32 that is secured on the lower end of the hopper 28. The hopper 28 is filled with welding flux in powdered or granular form, and while normally the hopper 28 is initially filled to its full capacity, the flux F is indicated herein as extending up to a level L. The welding tip 30 is thus completely surrounded by the flux F, and this flux may flow downwardly through the discharge orifice 31 in an annular stream about the welding wire R as the wire R moves through the orifice 31 and toward a welding point such as the joint J between the work pieces W that are to be welded together.

The flexible hose-like housing 26 is shown in detail in Fig. 1 of the drawings, and as there shown it will be evident that this flexible housing 26 is afforded throughout most of its length by a flexible sleeve 55 of electrical-insulating material such as natural or synthetic rubber, or any suitable insulating plastic material having the requisite flexibility. Within this sleeve 55, a central passage is afforded by a coil spring 56 that is made from spring wire with the coils wound quite closely, and this affords a passage through which the flexible welding wire R may pass to the welding tip 30. The annular space between the coil spring 56 and the internal surface of the insulating sleeve 55 serves to house the electrical conducting means whereby the necessary low resistance current path is established between the lug 44 and the welding tip 30, and it should again be emphasized that the flexible housing 26 is separably related with respect to the extension 26E, as will be explained. The electrical conducting path is in the present instance afforded primarily by a plurality of independently formed wires 57 that are disposed parallel to and in an annular series about the coil spring 56 so as to be confined within the insulating sleeve 55. These wires 57 are held in the proper relationship with respect to the coil spring 56 during assembly as well as in use by winding a relatively strong wire 57W spirally around the series of wires 57, and after the wire 57W is thus secured in place, the entire assembly is covered by spirally winding an insulating tape 57T thereabout, as indicated in Fig. 1 of the drawings, after which this assembly is inserted into the insulating sleeve 55. At their right-hand ends, as illustrated in Fig. 1 of the drawings, the wires 57 extend into an axial socket 59 that is formed in a connecting sleeve 60 that is made from an electrically conducting material such as bronze. The ends of the wires 57 are preferably silver soldered into the socket 59 so as to afford a good electrical conducting path. It should be noted that the connecting sleeve 60 has a central bore therethrough and the end of the spring 56 extends through this bore and somewhat beyond the end 60E of the connecting sleeve 60 for purposes that will appear hereinafter. About the sleeve 60 and spaced substantially from the end 60E thereof, an annular insulating handle 61 is afforded, and this handle is secured in position by means including a set screw 62, and this set screw extends through the sleeve 60 and engages the coil spring 56 so as to thereby fix the endwise position of the coil spring 56 with respect to the sleeve 60.

At the other or left-hand end of the flexible housing 26, a connecting sleeve 65 of an electrically conducting material such as bronze is provided and the adjacent end of the coil spring 56 extends into the central bore of the connecting sleeve 65 and is fixed in position therein by means such as a set screw 66. The right-hand end of the connecting sleeve 65, as viewed in Fig. 1, has a connecting socket 67 formed therein and the adjacent ends of the wires 57 extend into the socket 67 and are silver soldered therein.

The connecting sleeve 65 serves as a part of the means for affording a disengageable electrical and physical connection between the housing 26 and the extension 26E, and for this purpose, the left-hand end of the sleeve 65 has an internally tapered socket 65S formed therein to receive the adjacent end of the extension 26E, as will be described.

The tapered socket 65S is arranged to receive the externally tapered end 67T of a metallic sleeve 67 that forms the external member of the extension 26E. This metallic sleeve is preferably made from copper and has a relatively thick wall to afford the necessary area in the conductive path, and within the sleeve 67, a coil spring 56E is mounted. It should be pointed out that the coil spring 56 and the coil spring 56E are provided merely for the purpose of affording a wearing surface to bear against the welding wire, and since the extension 26E need not be flexible, the internal surface may, in some instances, be afforded by a solid tubular member of steel or like material rather than as a spring 56E.

The tapered end 67T of the tubular member 67 may be firmly clamped endwise into the tapered socket 65S by operation of the removable handle 27, which in such functioning acts as a nut. Thus it will be noted in Fig. 1 of the drawings that the handle 27 at its left-hand end has a slightly enlarged counter bore 67C that terminates in a shoulder 67S facing to the left in Fig. 1, and adjacent its left-hand end, the counter bore 67C is internally screw threaded as at 67T so that it may be threaded onto what amounts to a threaded nipple 70 that extends outwardly in a lateral direction from one side of the hopper 28, the nipple 70 extending through and opening into the hopper 28 and being rigidly secured thereto as by welding at 71. The connecting sleeve 65 has an external abutment formed thereon by a snap-ring 73 so that the snap-ring 73 may be engaged by the shoulder 67S, and means are afforded for holding the end of the sleeve 67 against left-hand movement with respect to the nipple 70. As shown in Fig. 1, this is accomplished by affording an annular collar 74 on the sleeve 67 adjacent to the large end of the tapered end 67T, and this ring 74 may be made from brass and may be secured to the sleeve as by silver soldering. Within the nipple 70, an insulating sleeve 75 is mounted so that it may surround the ring 74 and the adjacent end of the connecting sleeve 65, and this insulating sleeve 75 has an inwardly projecting annular flange 75F against which the abutment ring 74 may bear. The outer or left-hand face of the flange 75F is arranged to bear against an internal snap-ring 77 that is fixed within the nipple 70, and thus by tightening the handle 27, the tapered socket and the tapered end 67T may be forced into firm physical and electrical contact. It should be pointed out, in respect to the structure that has just been described, that the exension 26E is removably mounted with respect to the hopper 28, and the internal diameter of the nipple 70 and the snap-ring 77 are made large enough to permit ready withdrawal of the extension 26E when this is desired.

At its other or lower end, the sleeve 67 of the extension 26E is internally screw threaded as at 26T to receive the externally screw threaded upper end of the welding tip 30. This enables the welding tip 30 to be readily removed and replaced, such removal of the welding tip 30 being necessary in order to permit ready withdrawal of the extension 26E as above described. The welding tip, of course, requires replacement at intervals, either due to wear or when the diameter of the welding wire R is to be changed. As the welding wire R must undergo substantially a 90° change of direction as it passes through the extension 26E, there is a tendency to assume a bent condition, and it has been found that this may be effectually overcome by forming the extension 26E with a first downward bend 426E that is greater than would otherwise be required, and then between the bend 426E and the tip 30, providing a relatively sharp connective bend 526E in the opposite direction.

The welding tip 30 is, of course, tubular in character, and the tip 30 is located in the desired centered relationship with respect to the discharge orifice 31 by means including a plurality of adjustable set screws 30S that extend radially through the upper portion of the discharge head 32 and which at their inner ends engage an insulating sleeve 80 that surrounds the tip 30 just below the lower end of the sleeve 67. These set screws 30S extend through suitable openings in the side wall of the hopper 28 so as to serve not only as a centering means for the welding tip 30, but also to hold the discharge head 32 in position on the hopper 28. It might be pointed out in this connection that the discharge head 32 also requires replacement at intervals due to wear, or to afford a different thickness of welding flux on the rod R, or to afford a different form of head where a different type of welding is to be done, as will be explained hereinafter.

When a welding arc is struck, the current flow in the welding wire R produces a magnetic field about the welding wire, and this field is utilized to cause the advancing welding wire R to be progressively coated with welding flux which, of course, must be of a magnetizable character, and while the thickness and density of this coating of welding flux tends to vary with the magnitude of the welding current, the limitation imposed by the diameter of the discharge orifice 31 renders this factor immaterial where small diameter welding wires are being used.

The magnetizable welding flux within the hopper 28 tends, of course, to flow downwardly and out through the annular space between the welding wire R and the sides of the discharge orifice 31, but during the actual welding operation, this tendency is controlled and limited by the magnetic field that is created about the welding wire. However, upon termination of a welding operation, the magnetizable welding flux tends once more to become a free flowing body so that there is a tendency for such welding flux to leak out of the discharge orifice 31. Under and in accordance with the present invention, means are afforded whereby such loss of welding flux is eliminated, and, as shown in Fig. 1 of the drawings, this result is attained by means of a simple and effective character. Thus, a plurality of permanent magnets 135 are mounted in the discharge head 32 at radially spaced points about the discharge orifice 31, and these magnets create a magnetic field across the discharge orifice and of such a strength as to block or overcome the free flowing tendency of the magnetizable flux.

During a welding operation, it is well known that there is a tendency for the molten metal to spatter, and the discharge head 32 under the present invention affords means for protecting the discharge orifice 31 against blocking by such spatter. Thus, as shown particularly in Fig. 1 of the drawings, an annular projecting flange 136 is provided in a centered relationship on the lower end of the discharge head 32, and while this flange 136 projects but a short distance, it has been found that this is sufficient to prevent splatter of molten metal upwardly into the discharge orifice 31, and this assures continued satisfactory operation of the present apparatus.

As hereinbefore pointed out, the present apparatus may be utilized for submerged arc welding, and the quick and easy adaptation of the apparatus for such use is illustrated in Fig. 1A of the drawings. Thus, in such an instance, the discharge head 32 is removed and is replaced by a discharge head 232 having a relatively large open lower end 232E so that the welding flux may flow freely through this opening and form a relatively heavy or deep flux blanket F2 as indicated in Fig. 1A. It will be recognized, of course, that in such use of the apparatus, the welding flux preferably does not have the magnetizable characteristic hereinbefore described.

In Fig. 4 of the drawings, an alternative embodiment of the invention is illustrated wherein the blocking or valve magnets 135 have been eliminated, and in this instance, the welding tip 30 is identified as tip 330 and is made from a permanent magnet material. The tip 330 is magnetized so that north and south poles are formed at the respective ends thereof, and with this arrangement, the lower end of the welding wire R is continuously magnetized and this serves to attain a valving or blocking action at the discharge orifice 31 in the same general manner as the magnets 135 hereinabove described. In this instance, however, an additional advantageous effect is obtained in that the magnetizable flux is maintained on the projecting end of the welding rod R, even after the welding arc has been broken.

In Figs. 5 and 6, another alternative embodiment of the invention is illustrated in which magnetic forces are provided that are similar to the forces that are effective in the embodiment of the invention shown in Fig. 4. Thus, in the embodiment shown in Figs. 5 and 6, the magnets 135 are eliminated, and the welding tip 30 is of substantially the same form and material as that shown in and described with respect to Fig. 1. In this embodiment of the invention, however, a pair of horseshoe permanent magnets 435 are provided, and these magnets have their opposite poles extended through openings 436 in the side walls of the tip so that the pole faces of the magnets 435 are disposed adjacent to the welding wire. The magnets 435 are held in place by screws 437. The opposite north and south poles of each magnet 435 are, of course, spaced longitudinally with respect to the welding rod or wire, and corresponding poles of the two magnets 435 are located in corresponding positions. This serves to magnetize the lower end of the welding wire R, thus to produce the desired valving or retaining action and acting to prevent shedding of the magnetizable flux when the welding arc is discontinued.

From the foregoing description, it will be apparent that the present invention affords an insulated hopper that is highly advantageous and is safe in use. It will also be apparent that the apparatus of the present invention may be utilized for different types of arc welding and that the changes and revisions in the apparatus to change from one welding technique to another are quite simple in character. It will also be evident that the apparatus of the present invention affords means for controlling the application of magnetizable welding flux to an uncoated welding wire and that under the present invention, the projecting coated portion of a welding wire is maintained in its coated condition even after the welding arc is broken.

Under the present invention, the feeding of the welding wire through the flexible guide housing is attained in a simple and advantageous manner, and the guide means that form the guide housing are related in such a way that the forward portions of the welding wire may readily be removed in case the wire freezes to the welding tip in the course of a welding operation. The hopper that is afforded for the welding flux is of such a character that it may be readily handled and manipulated, and in this connection it is to be observed that the handle, by means of which the hopper is supported, serves the additional function of securing the separate portions of the flexible guide housing together. In the use of the welding hopper of the present invention, the lower discharge orifice through which the welding wire passes is protected against clogging by splatter of the molten welding material, and this assures continued proper operation of the welding apparatus.

Thus, while I have illustrated and described the preferred embodiments of my invention, it is to be understood that these are capable of variation and modification.

I claim:

1. In a welding apparatus, a hopper for containing magnetizable welding flux and having a discharge opening slightly larger than the welding wire that is to be used, means including a welding tip disposed within said hopper in aligned axially spaced relation to said discharge opening and through which a welding wire may be advanced through the space between said tip and said opening to magnetically attract and thereafter carry a coating of such magnetizable flux due to the flow of welding current through said welding wire, and to be thereafter fed with its coating of flux through said opening to an extended welding position, said tip being formed of magnetizable material and being magnetized to form north and south poles spaced longitudinally of and adjacent to the path of the welding wire to magnetize the end portions of such a wire within and outwardly of said opening to prevent undesired flow of such magnetizable flux from said opening and prevent shedding of such flux from the projecting end of the welding wire when the welding circuit is broken.

2. In a welding apparatus, a hopper for containing magnetizable welding flux and having a discharge opening slightly larger than the welding wire that is to be used, means including a welding tip disposed within said hopper in aligned axially spaced relation to said discharge opening and through which a welding wire may be advanced through the space between said tip and said opening to magnetically attract and thereafter carry a coating of such magnetizable flux due to the flow of welding current through said welding wire, and to be thereafter fed with its coating of flux through said opening to an extended welding position, and a permanent magnet secured to said tip to provide north and south poles spaced longitudinally of and adjacent to the path of the welding wire to magnetize the end portions of such a wire within and outwardly of said opening to prevent undesired flow of such magnetizable flux from said opening and prevent shedding of such flux from the projecting end of the welding wire when the welding circuit is broken.

3. A discharge head adapted to be secured on the discharge end of a welding flux hopper, said head being cup-shaped and having side walls and a bottom wall with a flux-discharge opening therein, an orifice protecting flange coaxially disposed with respect to said opening and of a larger size and projecting from the outer surface of said bottom wall, and magnetic means mounted in said bottom wall adjacent said orifice and operable as a valve to prevent undesired flow of magnetizable flux through said opening.

4. In an arc welding apparatus, a supply hopper for containing welding flux, said hopper having a side wall terminating in an open discharge end, said side wall having a plurality of holes thereabout adjacent said discharge end, a discharge head adapted to be disposed in an operative position surrounding said lower end of said side wall and having a bottom wall with a discharge opening therein, and a plurality of set screws extending through the side wall of said head and through said holes to detachably secure said discharge head in position and locate the ends of said set screws within said hopper for centering a welding tip thereon with respect to the discharge opening in the discharge head.

5. In a continuous welding apparatus, a welding flux hopper having a side wall and a lower discharge opening, a two-section hollow tubular member for guiding a welding wire into said hopper and out through said discharge opening, one of said sections being rigid in character and being disposed primarily within said hopper, and having a first end extending outwardly through said side wall for connection with a first end of the other section, and the other of said sections being flexible, said sections having axially related complemented tapered head and socket surfaces at said first ends thereof and engaged with each other outside of and adjacent to said side wall, and cooperating means on said hopper and said sections and including a tubular handle surrounding said first end of said flexible section for applying endwise engaging forces to said socket surfaces.

6. In a continuous welding apparatus, a welding flux hopper having a side wall and a lower discharge opening, a two-section hollow tubular member for guiding a welding wire into said hopper and out through said discharge opening, one of said sections being rigid in character and being disposed primarily within said hopper, and having a first end extending outwardly through said side wall for connection with a first end of the other section, and the other of said sections being flexible, said sections having axially related complemented tapered head and socket surfaces at said first ends thereof and engaged with each other outside of and adjacent to said side wall, and cooperating means on said hopper and said sections and including a threaded nipple fixed on said hopper and an internally threaded tubular handle surrounding said first end of said flexible section for applying endwise engaging forces to said socket surfaces.

7. In a continuous welding apparatus, a welding flux hopper having a side wall and a lower discharge opening, a two-section hollow tubular member for guiding a welding wire into said hopper and out through said discharge opening, one of said sections being rigid in character and being disposed primarily within said hopper, and having a first end extending outwardly through said side wall for connection with a first end of the other section, and the other of said sections being flexible, said sections having axially related complemented tapered head and socket surfaces at said first ends thereof and engaged with each other outside of and adjacent to said side wall, and cooperating means on said hopper and said sections and including a threaded nipple on said hopper and having an internal shoulder facing outwardly of the nipple, an insulating sleeve in said nipple having an inturned flange engaging said shoulder, a shoulder on said first end of said rigid section engaging said flange inside of said insulating sleeve, an external abutment on said first end of said flexible section and an internally threaded tubular handle surrounding said first end of said flexible section and having an internal shoulder facing toward said nipple and engaging said external abutment for applying endwise engaging forces to said socket surfaces.

8. In a continuous welding apparatus, a welding flux hopper having a side wall and a lower discharge opening, a two-section hollow tubular member for guiding a welding wire into said hopper and out through said discharge opening, one of said sections being rigid in character and being disposed primarily within said hopper, and having a first end extending outwardly through said side wall for connection with a first end of the other section, and the other of said sections being flexible, said sections having axially related complemented tapered head and socket surfaces at said first ends thereof and engaged with each other outside of and adjacent to said side wall, cooperating means on said hopper and said sections and including a projecting threaded nipple fixed on said hopper and having an internal shoulder facing outwardly of the nipple, an insulating sleeve in said nipple having an inturned flange engaging said shoulder, a shoulder on said first end of said rigid section engaging said flange inside of said insulating sleeve, an external abutment on said first end of said flexible section, and an internal threaded tubular handle made from insulating material and surrounding said first end of said flexible section and having an internal shoulder facing toward said nipple and engaging said external abutment for applying endwise engaging forces to said socket surfaces.

References Cited in the file of this patent

UNITED STATES PATENTS

| 2,198,085 | LeTourneau et al. | Apr. 23, 1940 |
| 2,478,525 | Cutrer | Aug. 9, 1949 |
| 2,536,294 | Landis et al. | Jan. 2, 1951 |
| 2,666,122 | Curtin et al. | Jan. 12, 1954 |
| 2,666,832 | Landis et al. | Jan. 19, 1954 |
| 2,803,740 | Hyink | Aug. 20, 1957 |

FOREIGN PATENTS

| 608,270 | Great Britain | Sept. 13, 1948 |

OTHER REFERENCES

"Industry and Welding" monthly for February 1954, pp. 66–68.